(No Model.)
R. BELFIELD.
METHOD OF AUTOMATIC REGULATION FOR ELECTRIC CURRENTS.
No. 386,797. Patented July 31, 1888.
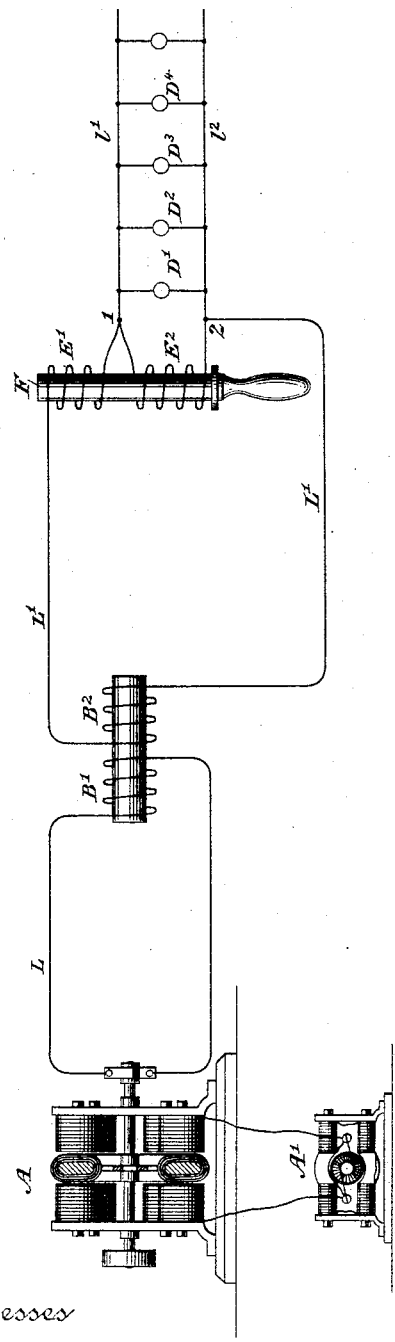
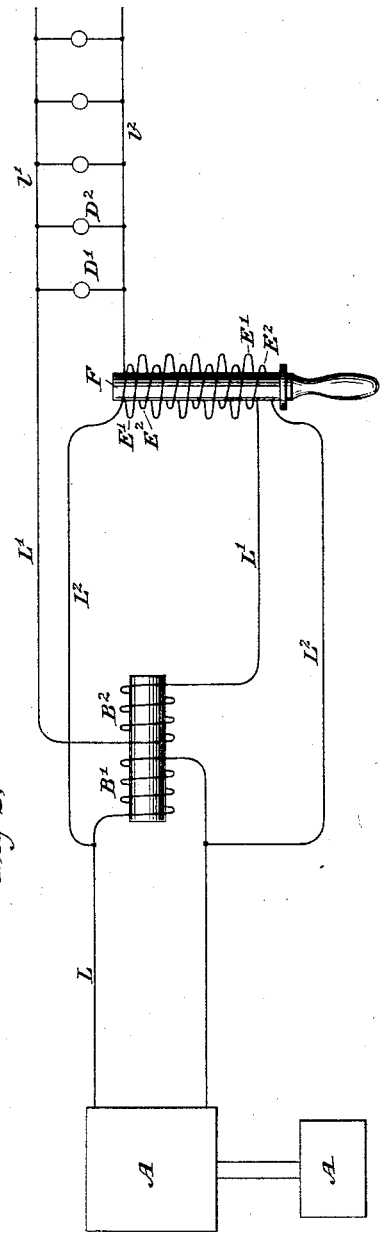
Witnesses
Geo. W. Breck.
Carrie E. Ashley
Inventor
Reginald Belfield,
By his Attorneys
Pope & Edgecomb

UNITED STATES PATENT OFFICE.

REGINALD BELFIELD, OF GREAT BARRINGTON, MASSACHUSETTS, ASSIGNOR TO GEORGE WESTINGHOUSE, JR., OF PITTSBURG, PENNSYLVANIA.

METHOD OF AUTOMATIC REGULATION FOR ELECTRIC CURRENTS.

SPECIFICATION forming part of Letters Patent No. 386,797, dated July 31, 1888.

Application filed June 29, 1886. Serial No. 206,568. (No model.)

*To all whom it may concern:*

Be it known that I, REGINALD BELFIELD, a subject of the Queen of Great Britain, temporarily residing in Great Barrington, in the county of Berkshire and State of Massachusetts, have invented certain new and useful Improvements in the Method of Automatic Regulation for Electric Circuits, of which the following is a specification.

The invention relates to systems of electrical distribution wherein alternating, undulatory, intermittent, or pulsatory electric currents of any required potential and derived from any convenient source are transformed or converted to a greater or less extent into counter electro-motive force or induced currents.

The invention comprises an improved method of operation whereby the translating devices may be supplied with currents of the proper or required potential with greater economy and convenience than by the methods heretofore practiced.

The general plan of the invention consists in performing the following steps: first, the transmitting of alternating, undulatory, intermittent, or pulsatory currents of any required potential to an inductorium consisting of a mass of iron situated in inductive relation to a continuous conductor; second, establishing thereby a constant counter electro-motive force which is equally distributed throughout the conductor in such inductive relation; third, utilizing the whole or any desired portion of such counter electro-motive force in the production of a composite current which is formed in part by the impressed electro-motive force and in part by the counter electro-motive force, and, fourth, operating by such composite current translating devices placed in the work-circuit.

The composite current results from the superposition of more or less of this counter electro-motive force upon the impressed electro-motive force. The translating devices placed in the work-circuit, therefore, are operated neither by the impressed nor by the counter electro-motive force solely, but by the resultant composite current. When it is desired to vary the potential or to operate the translating devices under a difference of potential other than that of the impressed electro-motive force, it may be effected by changing the relations of the core and its coils.

In the accompanying drawings, Figure 1 is a diagram illustrating an organization of circuits and apparatus adapted to carry out the invention, and Fig. 2 illustrates a modified organization.

Referring to the figures, A represents a magneto or dynamo electric generator or other convenient source of electric energy. The generator is designed to supply alternating or intermittent or equivalent currents to a main line, L, and it is constructed in any suitable well-known manner. An alternating machine whose field-magnets are supplied by dynamo A′ will be found adapted to this purpose.

An induction apparatus, herein termed a "converter," has a primary coil, B′, in the main line L and a secondary coil, B², included in a secondary circuit, L′. These coils surround a core of soft iron in a manner well understood. The conductor L′ is connected through the coils E′ and E², which are placed in inductive relation to a core of soft iron, F. The coils E′ and E² are in reality but one continuous coil, although here shown as formed in section. They are, however, wound continuously upon the core, and they are so situated with reference to the core that every portion of the conductor comprised in the coils is in mutual inductive relation to every other portion through the medium of the soft iron, provided the core F occupies the position with reference to the coils shown in the drawings. The core F may, however, be withdrawn to a greater or less extent from the coils, for the purpose hereinafter set forth. The conductor and the mass of magnetizable material together constitute what may be conveniently termed a "regulator."

From the point 1, between the two sections E′ and E², a conductor, l′, is led off, and from the point 2, at the terminal of the coil E², a second conductor, l², is derived. Between these two conductors there are placed electric lamps or other translating devices, D′ D² D³ D⁴, so arranged that they form a closed work-circuit. If, now, a current of a given difference of potential is established in the conductor L′ a certain counter electro-motive force will be set up by reason of the presence of the coils E' E² and the core F, and this counter electro-motive force will be uniformly distributed through the entire length of the conductor comprising the coils. This counter electro-motive force will be nearly equal to the difference of potential established at the terminals of the coils by the impressed electro-motive force, disregarding the loss which is due to conversion. If we assume that the section E' is equal to the section E², then there will be delivered upon the work-circuit l' l² a composite current having a difference of potential one-half as great.

Now it will be evident that the regulator may be constructed to afford any required current to the lights or translating devices, and to maintain the same constant under the conditions of varying resistance; but it frequently chances that it is desired to reduce or to increase the current, and to accomplish this in a convenient manner the regulator is constructed so that the relation of the core F to the coil E', or, if so desired, with reference to both coils E' and E², may be modified at will. Thus in Fig. 1 the core is represented as being removable from both the coils E' and E², which are wound side by side. The parts are so arranged in this instance that it will be withdrawn from the coil E' first, so that the inductive effect upon that coil will be modified rapidly, while the self-induction of the coil E² remains. It is evident that by withdrawing the core entirely from the coil E' the self-induction will be entirely removed from it, and between the maximum and minimum limits any desired degree of inductive action may be obtained.

In Fig. 2 a modification is illustrated. In this instance the primary coil B' of the inductorium or converter is connected in multiple arc with the coil E² of the regulator. The secondary coil B² of the inductorium is connected in series with the coil E' of the regulator, and the translating devices are included between the conductors l' and l², leading from the remaining terminal of the coil of the converter and that of the coil E' of the regulator, respectively.

The regulator may in this instance be constructed in the same manner as described with reference to Fig. 1, or it may be constructed, as shown, with the primary coil surrounding the secondary coil, and the latter being either secured to the support of the core F or not, as desired.

I claim as my invention—

1. The hereinbefore-described method of supplying translating devices with alternating, intermittent, or pulsatory currents of any required potential, which consists, first, in establishing in a supply-circuit a constant counter electro-motive force equally distributed throughout a fixed length of said circuit; second, in utilizing the whole or any desired portion of said counter electro-motive force in the production of a composite current, and, lastly, in operating by such composite current translating devices placed in the work-circuit, substantially as described.

2. The hereinbefore described method of supplying currents of any required potential to a work-circuit from a source of currents of a different potential, which consists in establishing in the supply-circuit a constant counter electro-motive force by the action of the impressed electro-motive force, and superposing the impressed electro-motive force upon the counter electro-motive force, and thereby producing and delivering to the work-circuit a resultant composite current having a different potential from that of the impressed electro-motive force, substantially as described.

In testimony whereof I have hereunto subscribed my name this 7th day of May, A. D. 1886.

REGINALD BELFIELD.

Witnesses:
   A. C. COLLINS,
   JOHN C. WHEELER.